US012544316B2

(12) United States Patent
Hwang

(10) Patent No.: US 12,544,316 B2
(45) Date of Patent: Feb. 10, 2026

(54) SILICONE BABY BOTTLE WITH ENHANCED WATER SEALING

(71) Applicant: Estuen Inc., Siheung-si (KR)

(72) Inventor: Kui Hyun Hwang, Round Rock, TX (US)

(73) Assignee: Estuen Inc., Siheung-si (KR)

( * ) Notice: Subject to any disclaimer, the term of this patent is extended or adjusted under 35 U.S.C. 154(b) by 0 days.

(21) Appl. No.: 18/641,633

(22) Filed: Apr. 22, 2024

(65) Prior Publication Data

US 2024/0269044 A1 Aug. 15, 2024

Related U.S. Application Data

(63) Continuation of application No. PCT/KR2022/003558, filed on Mar. 15, 2022.

(30) Foreign Application Priority Data

Oct. 21, 2021 (KR) ........................ 10-2021-0140951

(51) Int. Cl.
*A61J 11/04* (2006.01)
*A61J 9/00* (2006.01)

(52) U.S. Cl.
CPC *A61J 11/04* (2013.01); *A61J 9/00* (2013.01)

(58) Field of Classification Search
CPC ..... A61J 11/04; A61J 9/00; A61J 11/00; A61J 11/045; B65D 45/32; B65D 45/34; B65D 45/345; B65D 45/02

(Continued)

(56) References Cited

U.S. PATENT DOCUMENTS 4,676,386 A * 6/1987 Phlaphongphanich ...................... A61J 11/006 215/11.1
5,323,517 A * 6/1994 Su ............................ A61J 11/04 24/20 EE (Continued)

FOREIGN PATENT DOCUMENTS

KR 20-0250901 Y1 11/2001
KR 20-0332520 Y1 11/2003

(Continued)

OTHER PUBLICATIONS

International Search Report for PCT/KR2022/003558 dated Jul. 12, 2022.

*Primary Examiner* — Don M Anderson
*Assistant Examiner* — Justin Caudill
(74) *Attorney, Agent, or Firm* — Sughrue Mion, PLLC

(57) ABSTRACT

Provided is a silicone feeding bottle with enhanced water-sealing properties where the upper portion is open for content insertion, while the body gradually decreases in cross-sectional width from the bottom to the top, forming a gentle curvature resembling a trumpet, conch shell, or similar shape, thus comprising a body characterized by a spiral design. Additionally, the feeding bottle includes a nipple portion detachably attached to the body, along with a coupling means for coupling the nipple portion to the body. The basal coupling part of the nipple portion has a cross-sectional shape resembling the numeral "¬," comprising a basal coupling protrusion that mates with the upper fastening protrusion, a basal horizontal plane extending horizontally from the upper fastening protrusion, and a basal vertical plane extending perpendicularly from the basal horizontal plane.

5 Claims, 5 Drawing Sheets

(58) Field of Classification Search
USPC ............................ 220/324; 215/379; 24/517
See application file for complete search history.

(56) References Cited

U.S. PATENT DOCUMENTS

| | | | | | |
|---|---|---|---|---|---|
| 6,099,519 | A * | 8/2000 | Olsen | A61M 16/0463 604/533 |
| 6,253,935 | B1 * | 7/2001 | Fletcher | A61J 11/045 215/11.1 |
| 7,350,834 | B2 * | 4/2008 | Ryhman | F16L 23/04 285/419 |
| 9,890,884 | B1 * | 2/2018 | Chiproot | F16L 21/005 |
| 2003/0141268 | A1 * | 7/2003 | Kerns | A61J 17/10 215/11.1 |
| 2011/0155684 | A1 * | 6/2011 | Sirota | A61J 9/04 215/11.5 |
| 2017/0258687 | A1 * | 9/2017 | Itzek | A61J 11/02 |
| 2018/0148236 | A1 * | 5/2018 | Flood | B05B 11/1047 |

FOREIGN PATENT DOCUMENTS

| | | | |
|---|---|---|---|
| KR | 10-0806760 | B1 | 2/2008 |
| KR | 10-1074316 | B1 | 10/2011 |
| KR | 10-2013-0045161 | A | 5/2013 |
| KR | 10-1610589 | B1 | 4/2016 |
| KR | 10-2272181 | B1 | 7/2021 |

* cited by examiner

【FIG. 1】
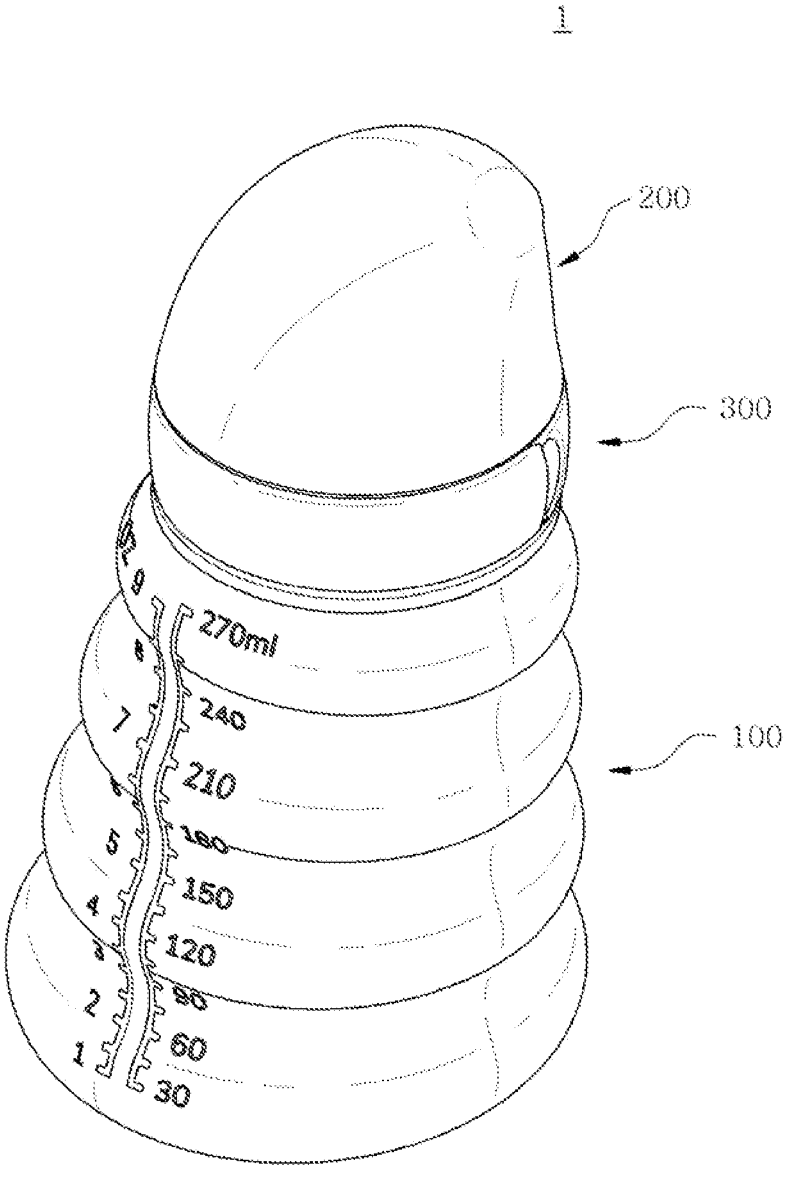

【FIG. 2】
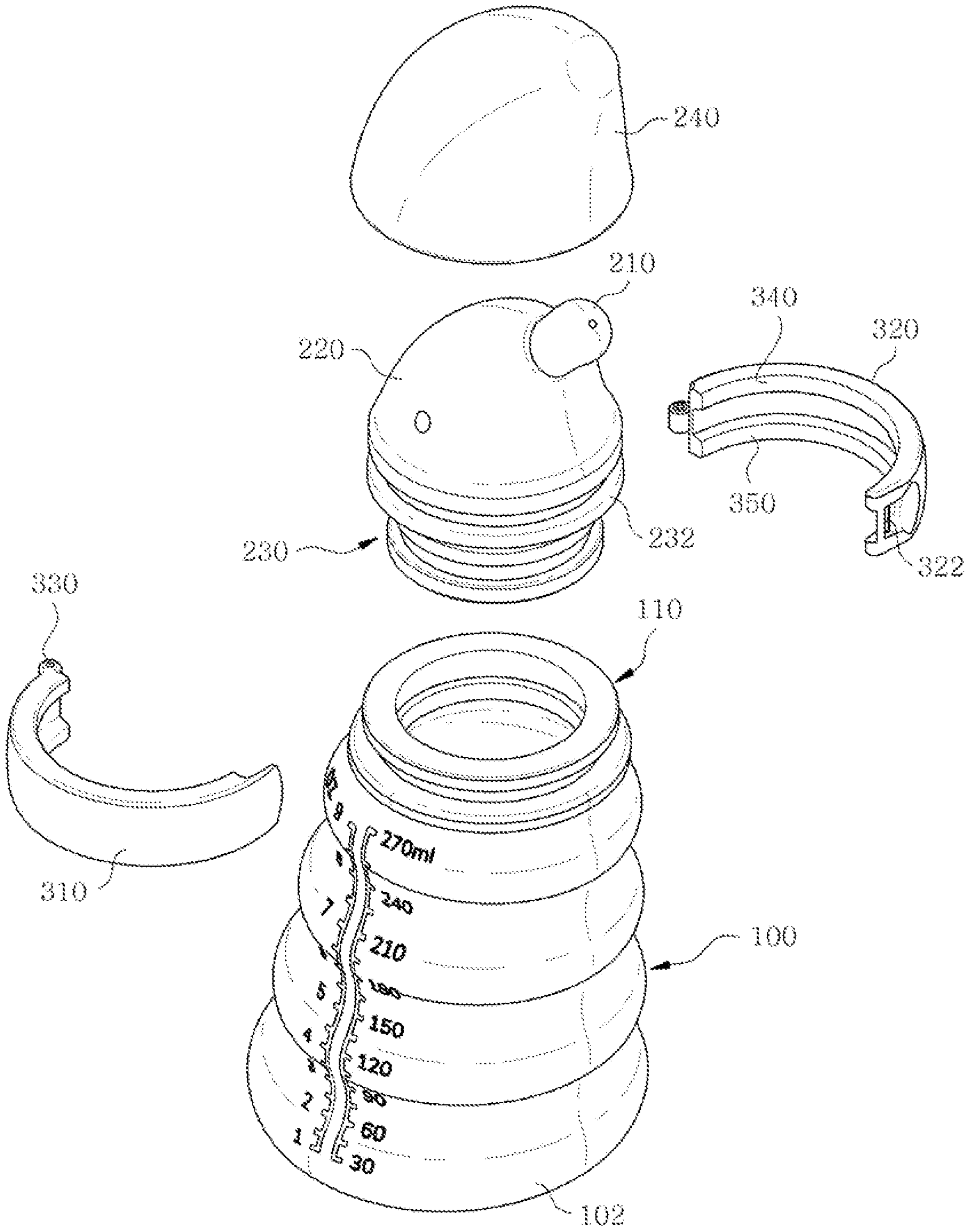

【FIG. 3】
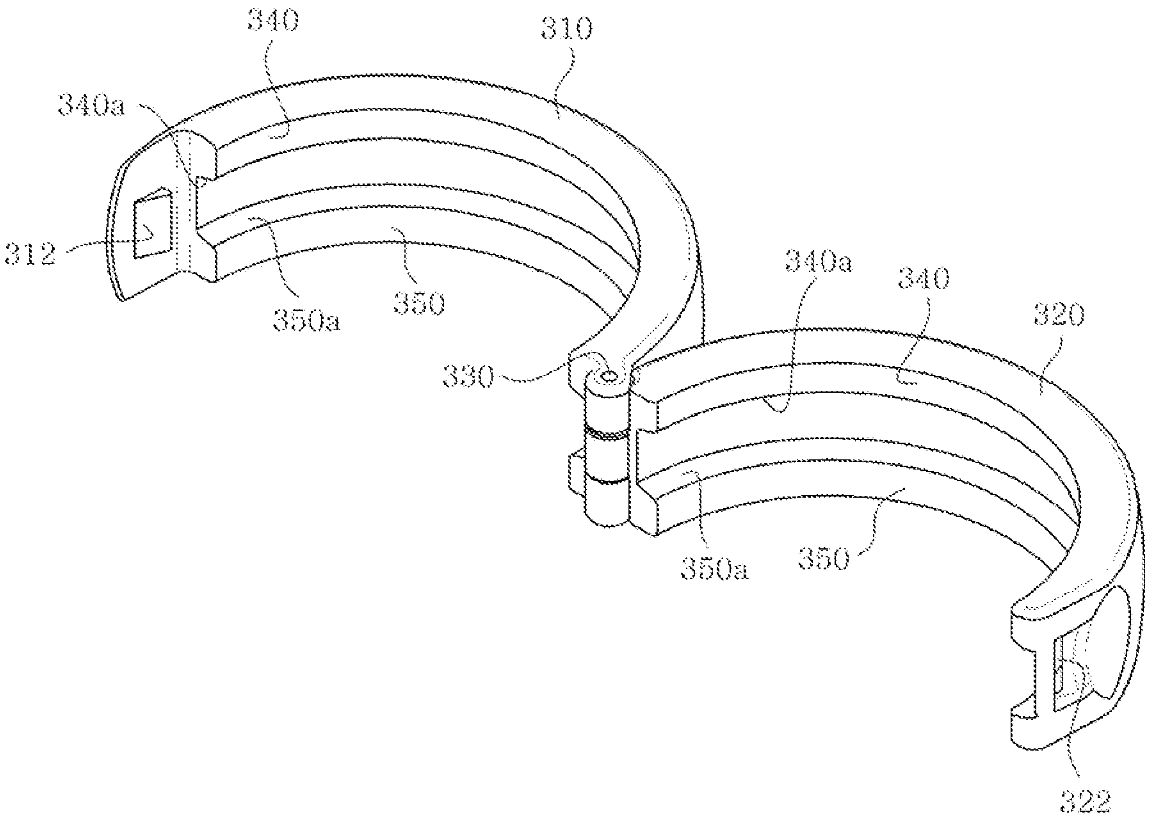

【FIG. 4】
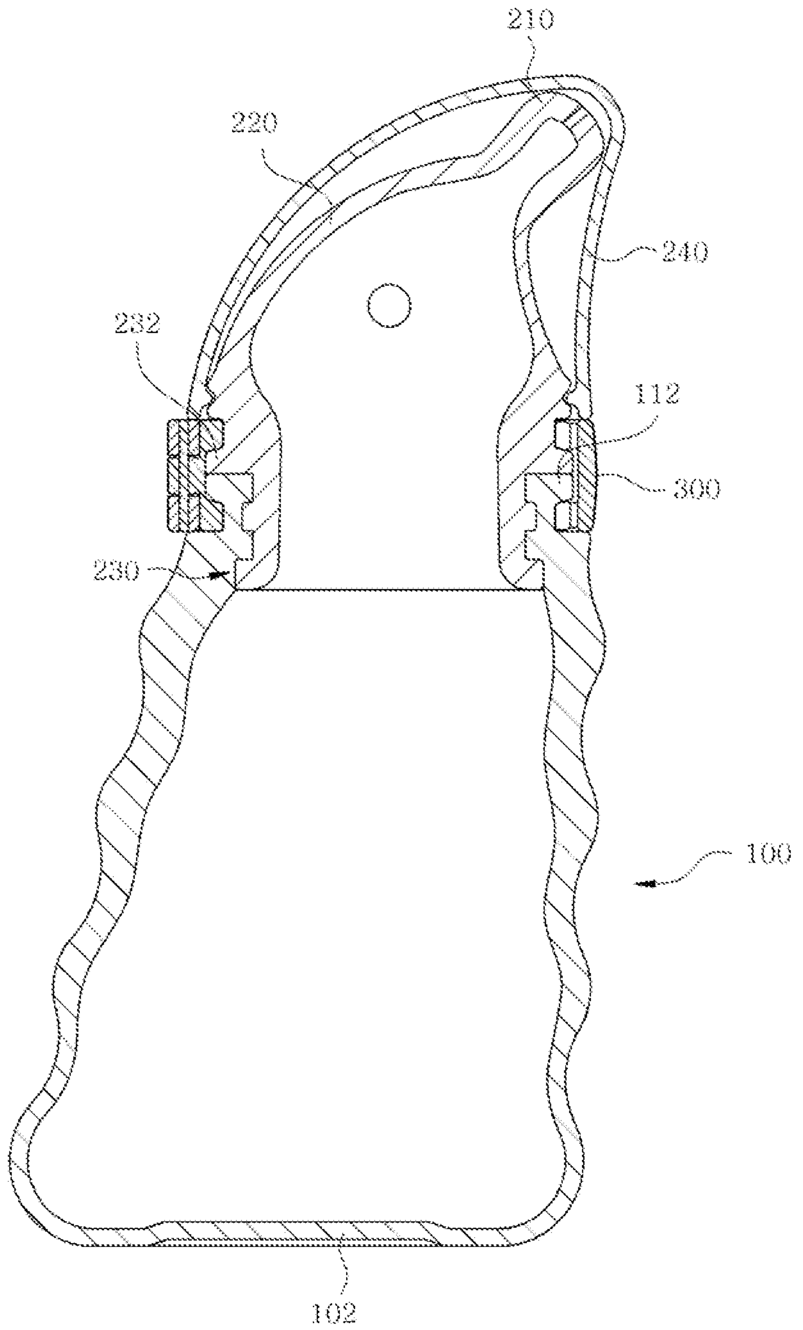

【FIG. 5】
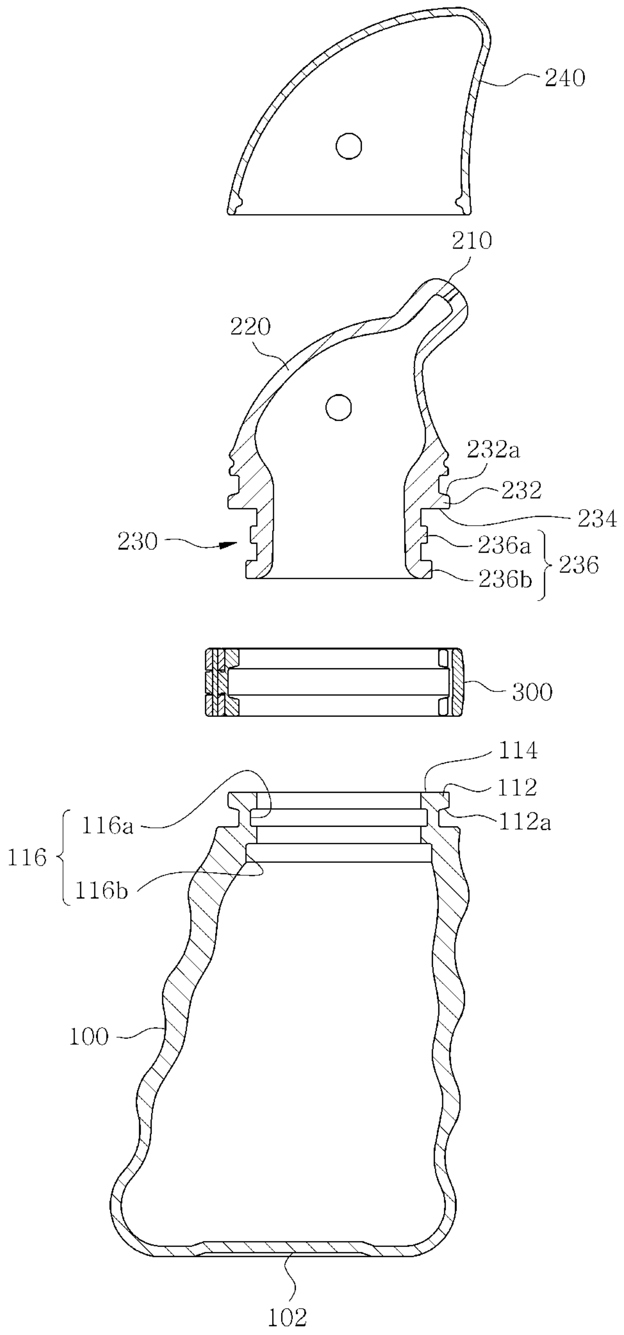

SILICONE BABY BOTTLE WITH ENHANCED WATER SEALING

CROSS REFERENCE TO RELATED APPLICATIONS

This application is a Continuation of International Application No. PCT/KR2022/003558 filed Mar. 15, 2022, claiming priority based on Korean Patent Application No. 10-2021-0140951 filed Oct. 21, 2021, the entire disclosures of which are incorporated herein by reference.

BACKGROUND OF THE DISCLOSURE

Technical Field

This disclosure relates to a silicone baby bottle. It comprises a body made of silicone material and improves the bonding strength between the body and the nipple part. This enhancement in the bonding strength helps to prevent the leakage of formula milk by increasing the water-sealing capability of the bottle.

Background Technology

Generally, infant baby bottles are made of plastic because it is inexpensive, lightweight, and does not break easily. Furthermore, once used, these baby bottles are typically sterilized by boiling in water. This sterilization process is necessary because infants do not yet have the immune capability to fend off germs, and there is a risk of germ transmission through the use of the baby bottles.

However, traditional infant baby bottles are made of plastic, which poses a significant problem: when sterilized in boiling water, harmful endocrine disruptors can be released, potentially affecting the infant's health.

Therefore, recently, there has been significant development in baby bottles made from silicone, which does not release endocrine disruptors. These bottles are designed with a soft body and nipple that securely and tightly fit together through a water-sealing coupling structure ensured by a rigid fastening ring. Additionally, the inherent flexibility of the silicone material provides a touch similar to human skin, which can contribute to the emotional development of infants and young children.

However, due to the inherently soft nature of silicone material, there has been a drawback concerning its water-sealing capabilities. Consequently, this has led to issues in ensuring the safety of milk feeding, as the seal integrity is compromised.

RELATED ART DOCUMENTS

Patent Documents (Patent Document 1) Korean Patent No. 10-1610589 (publication date: Apr. 7, 2016)

(Patent Document 2) Korean Patent Application Publication No. 10-2013-0045161 (publication date: May 3, 2013)

SUMMARY OF THE DISCLOSURE

The present disclosure has been devised to address the aforementioned problems of conventional designs. It aims to provide a silicone baby bottle wherein all components are made from ultra-pure silicone, which is harmless to the human body. Furthermore, it enhances the bonding strength between the bottle body and the nipple part, thereby improving the water-sealing capabilities of the silicone baby bottle.

To achieve the aforementioned technical objectives, the present disclosure includes a silicone baby bottle featuring a body that tapers from a bottom surface to a top end with a gradually decreasing cross-sectional width, forming a smooth curve. The body resembles a nautilus shell or horn shape and is structured with pleated tubing. The bottle incorporates a detachable nipple part at the distal of the body and fastening means for securing the nipple to the body. The fastening mechanism consists of a semi-circular first fastening ring and a second fastening ring, both pivoting around a hinge. Along the inner circumference of these rings, upper and lower fastening protrusions are formed. The upper fastening protrusion has a downward-sloping first inclined surface, and the lower fastening protrusion has an upward-sloping second inclined surface, enabling interlocking engagement with the base coupling part of the nipple and the distal coupling part in a ring-like formation. The base coupling part features a cross-sectional "¬" shaped configuration with a base fastening protrusion that interlocks with the upper fastening protrusion, a base horizontal plane extending horizontally from the distal coupling protrusion, and a base vertical plane extending perpendicularly from the base horizontal plane. The distal coupling part is designed to interlock with the lower fastening protrusion and continues into a distal horizontal plane that contacts the base horizontal plane, and a distal vertical plane corresponding to the base vertical plane.

According to one embodiment of the disclosure, the nipple part of the baby bottle, which is inserted into the baby's mouth, can be formed to incline at a certain angle toward the front side, similar to the base part.

According to one embodiment of the present disclosure, on the distal vertical surface, a first annular groove may be formed, and a second annular groove spaced apart from the first annular groove by a predetermined distance along a vertical direction may be formed. On the base vertical surface, the first annular protrusion that corresponds to the first annular groove and is coupled to the first annular groove may be formed, and a second annular protrusion that corresponds to the second annular groove and is coupled to the second annular groove may be formed.

According to one embodiment of the disclosure, the second annular protrusion has a diameter larger than the entrance diameter of the distal coupling part and protrudes more substantially than the first annular protrusion, thereby enhancing the water-sealing property.

According to one embodiment of the disclosure, the body, nipple part, and fastening means may be constructed from ultra-pure silicone material with less than 0.4% volatile organic compounds (VOCs).

EFFECTS OF THE DISCLOSURE

The silicone baby bottle enhanced by the present disclosure ensures that all components are constructed from ultra-pure silicone material with volatile organic compounds (VOCs) less than 0.4%, rendering it harmless for infant use. Moreover, by increasing the bonding strength between the bottle body and the nipple part, it effectively prevents formula milk from leaking while feeding or mixing the formula, offering a substantial improvement in functionality.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a perspective view of a silicone feeding bottle according to an embodiment of the present disclosure;

FIG. 2 is an exploded perspective view of the silicone feeding bottle according to an embodiment of the present disclosure;

FIG. 3 is a perspective view of a fastening means of the silicone feeding bottle according to an embodiment of the present disclosure;

FIG. 4 is a combined cross-section view of the silicone feeding bottle according to an embodiment of the present disclosure; and FIG. 5 is an exploded cross-section view of the silicone feeding bottle according to an embodiment of the present disclosure.

EMBODIMENT FOR IMPLEMENTATION OF THE DISCLOSURE

In the following, the embodiments of the present disclosure are described in detail with reference to the accompanying drawings, enabling those skilled in the relevant technical field to readily carry out the disclosure. However, it should be understood that the disclosures not limited to the specific embodiments described here. For the sake of clarity in explaining the disclosure in the drawings, parts that are not related to the description have been omitted, and similar reference numerals have been used throughout the specification for similar parts.

Throughout this specification, when a section is said to "comprise" a component, it is to be understood as not excluding other components, but rather that it can include additional components unless there is a statement to the contrary.

FIG. 1 is a perspective view of a silicone baby bottle according to an embodiment of the present disclosure. FIG. 2 is an exploded perspective view of the silicone baby bottle according to an embodiment of the present disclosure. FIG. 3 is a perspective view of the fastening means of the silicone baby bottle according to an embodiment of the disclosure. FIG. 4 is a sectional assembly view of the silicone baby bottle according to an embodiment of the disclosure. FIG. 5 is a sectional exploded view of the silicone baby bottle according to an embodiment of the disclosure.

The silicone baby bottle (1), as illustrated in FIG. 1 or FIG. 2, may generally include a body (100) that holds the contents, a nipple part (200) that is detachable and attaches to the tip of the body (100), and fastening means (300) for coupling the nipple part (200) with the body (100).

Initially, the body (100) of the bottle is designed with a bottom surface (102) and tapers gradually towards the top end with a reducing cross-sectional width. It is formed with a gentle curve into shapes reminiscent of a nautilus shell, conch, or horn, collectively resembling similar natural forms, and features a pleated tubing structure.

The body (100) of the bottle, the nipple part (200), and the fastening means (300) are all constructed from ultra-pure silicone material containing less than 0.4% volatile organic compounds (VOCs). Optionally, these components can be made from Liquid Silicone Rubber (LSR), which is commonly used for medical applications. This material choice allows for semi-permanent use, and offers hygienic, easy-to-clean, and easy-to-store properties. Additionally, the silicone is soft enough to allow the contents to be easily squeezed out by hand, enhancing usability during feeding.

The body (100) of the bottle is designed to store and contain milk formula, breast milk, or milk, featuring a sealed bottom surface (102) and an open top that forms a cylindrical shape. The shape can resemble a nautilus shell, a conch, a funnel, or similar natural forms such as a horn. Additionally, the surface of the body is marked with volume graduations (not shown) to enable users to easily discern the amount of liquid stored inside. Moreover, the body (100) forms a distal coupling part (110) at its open upper end. The cross-sectional width of the body tapers from the bottom surface (102) towards the distal coupling part (110), forming a gentle curve. Preferably, as depicted in FIG. 4, the thickness of the body may progressively increase from the bottom surface (102) to the distal coupling part (110).

Additionally, the body (100) is formed in a longitudinally corrugated shape, which facilitates easy compression and enables pumping actions.

Preferably, the corrugated form of the body (100) allows for some extent of stretching and expansion, but it does not deform easily under physical force.

In addition, to increase gripping power and stimulate the baby's tactile sense, the entire corrugated surface of the body (100) may be sanded to increase surface roughness.

Additionally, the distal coupling part (110) will be described in more detail in the following sections, where the fastening means (300) are explained.

The nipple section (200) may include the part of the nipple (210) that the baby puts in their mouth, and the base (220), which is integrally connected to the nipple (210) and comprises a non-detachable area.

The nipple section (200) may include a cover (240) to protect it from contaminants, and depending on the situation, the cover (240) may be made of plastic material.

For example, the nipple (210) can be formed by suitable methods such as compression molding or injection molding. Like the base (220), it is inclined at an angle ranging from 10° to 35° around a vertical axis, smoothly transitioning to this angle up to the body (100). Preferably, the nipple (210) is formed at an even greater angle to allow the baby to feed naturally without the need to tilt their head back.

Furthermore, as shown in FIG. 4, the nipple (210) can be formed with a cross-sectional thickness that is greater than that of the base (220).

In addition, the base (220) forms a gentle curved surface around the axis, expanding in area seamlessly from the nipple (210). Ideally, the ratio of the cross-sectional area between the nipple (210) and the base (220) can be 1:2.

In other words, when the cross-sectional area of the base (220) with a gentle curve is more than twice that of the nipple (210), the area in contact with the baby's lips increases, which may cause difficulty in breathing by being close to the nose. Conversely, if the cross-sectional area is smaller, it may be uncomfortable to take the base (220) including the nipple (210) into the mouth.

Furthermore, the base (220) includes an appropriate one-way air inlet, such as a duck-bill valve (not shown), which is integrally molded.

Additionally, the base (220) may be equipped with a coupling part (230) that is integrally extended towards the lower side and can be coupled while being partially inserted into the distal coupling part (110) of the body (100).

The coupling part (230) is also described in detail below, along with the fastening means (300)

As shown in FIG. 3, the fastening means (300) may consist of a first fastening ring (310) and a second fastening ring (320), which are in a semi-circular ring shape facing each other. The first fastening ring (310) and the second fastening ring (320) can be compressed or expanded around the hinge part (330) at the end side, forming a completed shape.

As they are compressed into the completed form, the fastening means secure the distal coupling part (110) of the body (100) to the coupling part (230) of the nipple section (200).

In addition, at the opposite end from the hinge part (330), one of either the first fastening ring (310) or the second fastening ring (320) is formed with a fastening protrusion (312), and the other with a fastening groove (322). Centered around the hinge part (330), when in the completed ring shape, the fastening protrusion (312) fits into the fastening groove (322) to maintain a fixed state.

According to an embodiment shown in FIG. 3, the fastening protrusion (312) is formed on the inner surface of the first fastening ring (310), and the fastening groove (322) can be formed through the end of the second fastening ring (320).

Furthermore, along the inner circumference of the first fastening ring (310) and the second fastening ring (320), an upper fastening protrusion (340) is formed at a certain shape, and at a certain distance below the upper fastening protrusion (340), a lower fastening protrusion (350) is integrally formed.

The upper fastening protrusion (340) is formed with a first inclined surface (340*a*) slanting downward, and the lower fastening protrusion (350) may be formed with a second inclined surface (350*a*) slanting upward.

On the other hand, the coupling part (230) that is integrally formed extending from the base (220) and couples to the distal coupling part (110) of the body (100), has a cross-sectional shape resembling the figure "¬". It is formed to mesh with the upper fastening protrusion (340), which is formed along the inner circumference of the first fastening ring (310) and the second fastening ring (320). A base fastening protrusion (232) is protruded to interlock with the upper fastening protrusion (340), and the base fastening protrusion inclined surface (232*a*) is formed to slope upwards, corresponding to the first inclined surface (340*a*), to receive pressure.

Continuing, a base horizontal surface (234) extends horizontally from the lower surface of the base fastening protrusion (232) and is formed over a certain area. From the base horizontal surface (234), a base vertical surface (236) may be formed at a right angle, extending to a certain length.

The base vertical surface (236) is a part that is inserted into the inside of the distal coupling part (110) and is crucial for enhancing the water-sealing.

On the base vertical surface (236), a first annular protrusion (236*a*) is integrally formed protruding from the vertical surface, and at a certain distance in the vertical direction from the first annular protrusion (236*a*), a second annular protrusion (236*b*) can be formed.

Here, the second annular protrusion (236*b*) is formed with a diameter larger than both the entrance diameter of the distal coupling part (110) of the body (100) and the diameter of the first annular protrusion (236*a*).

Additionally, a groove (drawing number not provided) can be formed on the upper side of the coupling part (230) for coupling with a cover (240).

Furthermore, the distal coupling part (110) corresponds to the upper part of the body (100), and a distal coupling protrusion (112) is formed on the outer surface to interlock with the lower fastening protrusion (350). A distal coupling protrusion inclined surface (112*a*) is formed slanting downward to be positioned in close contact with the second inclined surface (350*a*).

In addition, a distal horizontal surface (114) is formed on the upper surface of the distal coupling protrusion (112) to be in planar contact with the base horizontal surface (234). From the distal horizontal surface (114), a distal vertical surface (116) is integrally formed and extends inward, corresponding to the base vertical surface (236).

On the distal vertical surface (116), a first annular groove (116*a*) is formed, and at a certain distance vertically from the first annular groove (116*a*), a second annular groove (116*b*) may be formed.

The first annular groove (116*a*) accommodates the first annular protrusion (236*a*) of the base vertical surface (236), and the second annular protrusion (236*b*) is positioned to correspond and engage with the second annular groove (116*b*).

Since the second annular protrusion (236*b*) is formed with a larger diameter than the first annular protrusion (236*a*), the second annular groove (116*b*) is formed deeper than the first annular groove (116*a*), which enhances the coupling strength with the second annular protrusion (236*b*).

The operation of the feeding bottle according to the present disclosure, with the configuration described above, is explained with reference to FIGS. 4 and 5.

Through the open distal coupling part (110), formula, breast milk, or other milk can be contained within the body (100), and the level of contents can be checked through the markings.

Once the appropriate amount is filled, the base vertical surface (236) of the nipple section (120) at the coupling part (230) is inserted into the interior of the distal coupling part (110), and it is sealed and secured through the fastening means (300).

Here, as the base vertical surface (236) is inserted into the interior of the distal coupling part (110), the second annular protrusion (236*b*) positions within the second annular groove (116*b*), and the first annular protrusion (236*a*) positions within the first annular groove (116*a*) to prevent the leakage of the formula.

Furthermore, the second annular protrusion (236*b*) is positioned at the very bottom of the base vertical surface (236) to allow for a deeper engagement with the second annular groove (116*b*) of the distal vertical surface (116).

Along with this, the lower surface of the base horizontal surface (234) and the distal horizontal surface (114) come into close contact from above and below, thereby preventing secondary leakage.

As the first fastening ring (310) and the second fastening ring (320) rotate around the hinge part (330) and interlock, the first inclined surface (340*a*) of the upper fastening protrusion (340) positions on the inclined surface (232*a*) of the base fastening protrusion (232), applying downward pressure. Concurrently, the second inclined surface (350*a*) of the lower fastening protrusion (350) comes into close contact with the inclined surface (112*a*) of the distal coupling protrusion (112), applying upward pressure.

Therefore, as the interlocked base fastening protrusion (232) and distal coupling protrusion (112) are simultaneously subjected to pressure from above and below by the first fastening ring (310) and the second fastening ring (320), a third seal is created, effectively preventing any leakage of formula.

Furthermore, the body (100) is manufactured in a pleated tube shape where the cross-sectional area gradually expands from the coupling part where the nipple is attached down to the bottom, allowing easy grasping by infants and providing cognitive development benefits through tactile sensation. By making the nipple (210) thicker than the base (220), similar to the upper side of the body (100), it prevents the bottle from collapsing and avoids the risk of sudden feeding rate adjustments due to deformation of the bottle caused by the vacuum created inside when the milk is being sucked, thereby ensuring the structural integrity of the bottle.

In the enhanced water-sealing silicone feeding bottle developed by this disclosure, all constituent components are fabricated from ultra-pure silicone containing less than 0.4% volatile organic compounds (VOCs), thereby ensuring its harmlessness for infant use. Furthermore, the design enhances the adhesive strength between the bottle body and the nipple section, effectively preventing the leakage of milk or formula during feeding or when mixing the formula, thus ensuring a more reliable feeding experience.

While the detailed description of the present disclosure has discussed specific embodiments, various modifications can be made within the scope of the disclosure without departing from its bounds. Therefore, the scope of the disclosure should not be limited to the described embodiments alone, but should also be determined by the claims that follow and their equivalents.

[Description of Symbols]

| | |
|---|---|
| 1: FEEDING BOTTLE | 100: BODY |
| 110: DISTAL COUPLING PART | 200: NIPPLE PORTION |
| 210: NIPPLE | 220: BASE |
| 230: COUPLING PART | 240: COVER |
| 300: FASTENING MEANS | 310: FIRST FASTENING RING |
| 320: SECOND FASTENING RING | |

What is claimed is:

1. A silicone feeding bottle having enhanced water-sealing, comprising:
- a body that is configured so that a top portion thereof is opened to contain contents, consists of a corrugated pipe having a gently curved surface with a cross-sectional width gradually decreasing from a bottom surface to an upper portion, and is formed into a trumpet-shaped funnel, a conch shape, or a horn shape;
- a nipple portion attached to or detached from a distal coupling part of the body; and
- a fastening means for coupling the nipple portion and the body,
- wherein the fastening means consists of a first fastening ring and second fastening ring having a semicircular ring shape that opens and closes around a hinge,
- an upper fastening protrusion and a lower fastening protrusion are formed along inner peripheries of the first and second fastening rings,
- a first inclined surface facing downward is formed on the upper fastening protrusion, and a second inclined surface facing upward is formed on the lower fastening protrusion, and the first and second inclined surfaces engage in a ring shape and are coupled to a basal coupling part of the nipple portion and the distal coupling part,
- the basal coupling part consists of a base fastening protrusion that has a right-angled L-shape and engages the upper fastening protrusion, a base horizontal surface extending parallel to a distal coupling protrusion, and a base vertical surface extending from the base horizontal surface in a right angle direction, and
- the distal coupling part consists of a distal coupling protrusion formed to engage the lower fastening protrusion, a distal horizontal surface extending from the distal coupling protrusion to make surface contact with the base horizontal surface, and a distal vertical surface extending from the distal horizontal surface and corresponding to the base vertical surface.

2. The silicone feeding bottle according to claim 1, wherein a nipple that is placed in a baby's mouth at the nipple portion is formed to be inclined at a certain angle toward a front side.

3. The silicone feeding bottle according to claim 1, wherein, on the distal vertical surface, a first annular groove is formed, and a second annular groove spaced apart from the first annular groove by a predetermined distance along a vertical direction is formed, and
- on the base vertical surface, the first annular protrusion that corresponds to the first annular groove and is coupled to the first annular groove is formed, and a second annular protrusion that corresponds to the second annular groove and is coupled to the second annular groove is formed.

4. The silicone feeding bottle according to claim 3, wherein, to increase watertightness, a diameter of the second annular protrusion is larger than an inlet diameter of the distal coupling part, and the second annular protrusion protrudes so that the diameter of the second annular protrusion is larger than a diameter of the first annular protrusion.

5. The silicone feeding bottle according to claim 1, wherein the body, the nipple portion, and the fastening means are made of an ultrapure silicone material containing volatile organic chemicals (VOCs) in an amount of less than 0.4%.

* * * * *